United States Patent [19]

Bannink, Jr.

[11] Patent Number: 4,556,592
[45] Date of Patent: Dec. 3, 1985

[54] CONDUCTIVE JOINT SEALS FOR COMPOSITE AIRCRAFT

[75] Inventor: Engbert T. Bannink, Jr., Auburn, Wash.

[73] Assignee: The Boeing Company, Seattle, Wash.

[21] Appl. No.: 561,122

[22] Filed: Dec. 12, 1983

Related U.S. Application Data

[60] Continuation of Ser. No. 420,726, Sep. 21, 1982, abandoned, which is a division of Ser. No. 305,446, Sep. 25, 1981.

[51] Int. Cl.$^4$ .............................................. B65D 65/28
[52] U.S. Cl. .......................................... 428/43; 403/2; 403/24; 403/267; 428/223; 428/244; 428/273; 428/283; 428/315.7; 428/317.7; 428/408; 428/415
[58] Field of Search ................. 156/276, 254, 92, 289, 156/98, 307.3, 152, 313, 155, 330, 247, 344; 403/2, 267, 24; 252/511; 29/402.08, 426.4; 244/1 A, 133, 123, 135 R, 131; 339/275 R; 428/35, 273, 43, 408, 223, 415, 244, 283, 315.7, 317.7; 361/216, 218; 174/84 R, 84 S; 523/468

[56] References Cited

U.S. PATENT DOCUMENTS

| | | | |
|---|---|---|---|
| 2,688,576 | 9/1954 | Ryan et al. | 252/511 |
| 3,146,142 | 8/1964 | Maly | 156/289 |
| 3,192,091 | 6/1965 | Hey et al. | 156/344 |
| 3,347,978 | 10/1967 | Simon et al. | 156/276 |
| 3,723,223 | 3/1973 | Le Compte | 156/313 |
| 4,177,352 | 12/1979 | Sunbar et al. | 403/2 |
| 4,312,912 | 1/1982 | Tamura | 428/244 |
| 4,323,623 | 4/1982 | Ahrens et al. | 156/330 |

FOREIGN PATENT DOCUMENTS

| | | | |
|---|---|---|---|
| 1584006 | 2/1981 | United Kingdom | 252/511 |
| 711052 | 1/1980 | U.S.S.R. | 523/468 |

*Primary Examiner*—John J. Gallagher
*Attorney, Agent, or Firm*—Eugene O. Heberer; Delbert J. Barnard

[57] ABSTRACT

In a composite aircraft formed of graphite reinforced epoxy plates forming walls of the aircraft and walls of fuel tanks therein, for example, there is an adhesive seal for bonding overlapping faying plate surfaces together. The seal is formed of spaced glass fibers mixed with a conductive material and impregnated with a resin. The resin is cured between the surfaces of the plates to which it is bonded. The conductive filler is carbon in the form of approximate microspheres, generally hollow and having diameters in the range of 5 to 150 microns. The carbon microspheres function to weaken the adhesive seal between the plates so that they can be forcibly separated by a wedge without structural damage to the plates. The conductive material equalizes negative and positive static charges in the aircraft, particularly in fuel tanks, to eliminate electrical potential differences in the wall structures and in the materials therein.

15 Claims, 5 Drawing Figures

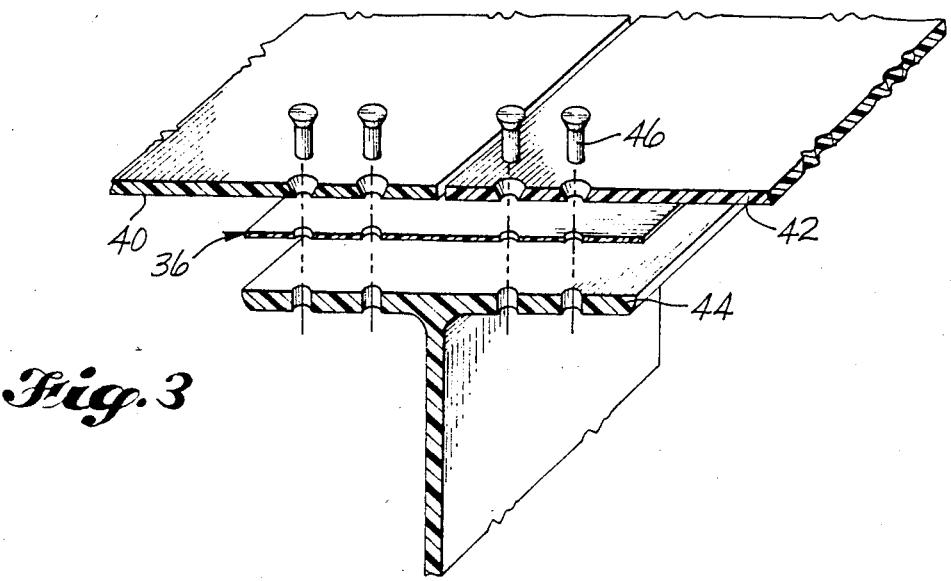
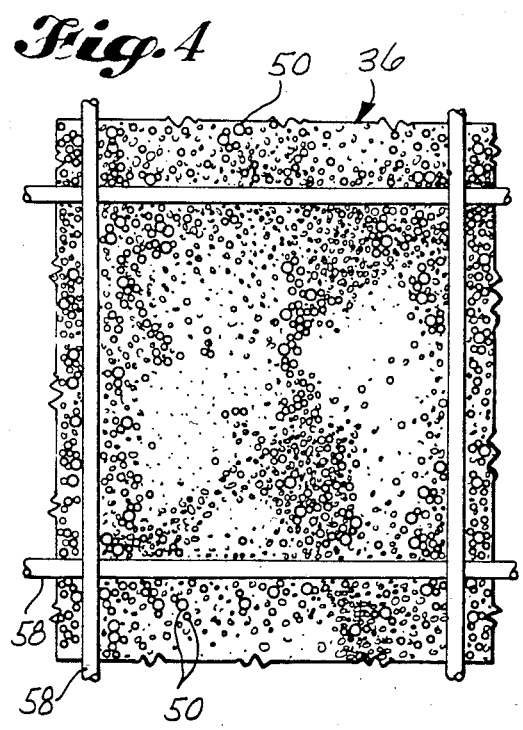
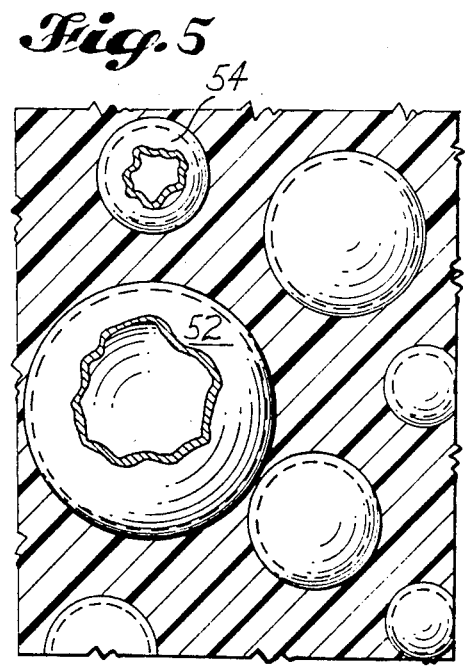

CONDUCTIVE JOINT SEALS FOR COMPOSITE AIRCRAFT

This application is a continuation of now abandoned Ser. No. 06/420,726 filed Sept. 21, 1982, which is a division of application Ser. No. 06/305,446, filed Sept. 25, 1981.

DESCRIPTION

1. Technical Field

The invention relates to composite aircraft made from reinforced epoxy resin plates in which the aircraft walls and parts thereof are formed of such plates which have overlapping faying surfaces bolted and bonded together. The bonding materials form seals between the plates, particularly for fuel tanks, integral with the wings or other parts of the aircraft structure.

Composites are combinations of materials differing in composition or form. The constituents retain their identities in the composites; that is, they do not dissolve or otherwise merge completely into each other although they act together. Normally, the components can be physically identified.

2. Background Art

The sealing of joints in a composite aircraft made from epoxy resins presents two problems with respect to the seals, particularly with respect to fuel tanks which would be positioned integrally in the aircraft, primarily in the wings. The first is an electrical current conduction problem in the composite joints and the second is in the repair of such joints. The possibility of repairs can relate to any part of the aircraft but particularly are required in fuel leak problems in the integral fuel tanks. Fuel leaks, particularly in military aircraft, are very common and are a high maintenance cost item. It is expected that this problem will exist in the same manner and to the same extent in composite aircraft where the fuel tanks are made of graphite reinforced epoxy resins.

None of the presently used sealing concepts in fuel tanks, except one, can stand up to the rigors of high loading and temperature extremes over an extended period of time. This fuel sealing concept with unusual reliability is in a bonded/bolted concept known as the "Scotchweld Process". It is usable in aluminum structures but is not applicable to composite structures because of the repair procedure. The repair procedure requires that the structure be cooled below freezing and that a wedge be driven between the aircraft skin and the substructure to break the adhesive bond that forms part of the tank seal. This repair operation does not damage the aluminum structure but if it were attempted with composite structures formed of epoxy resin plates, the skins and substructure of the plates would delaminate because the presently used matrix epoxy materials are more brittle than the adhesives, especially at low temperatures.

A search of the patent literature was made with respect to the electrical current conduction problem and the fuel tank leak problem but no solutions were found. For example, a Netherlands publication No. 7,404,508, dated Oct. 4, 1974, disclosed the embedding of particles in a thermoplastic layer bonded to metal. These bonds were provided to produce peel resistance of the plastic so as to cause it to separate from the metal along the line where the embedded particles would lie when the plastic is pulled in tension at right angles to the metal surface. When pulled at right angles, the plastic breaks along the embedded particles.

U.S. Pat. No. 3,347,978 suggests the use of carbon particles in a resin for rendering adhesive joints electrically conductive, column 3, line 62.

U.S. Pat. No. 3,728,427 teaches the use of a static electricity bleed in the form of a resinous gel which contains conductive metal slivers, flakes or needles.

The following patents found are considered to be of general interest: U.S. Pat. No. 3,140,342, U.S. Pat. No. 3,707,429, U.S. Pat. No. 3,726,738, U.S. Pat. No. 3,795,047, British Patent No. 698,210/53.

DISCLOSURE OF THE INVENTION

The invention is an adhesive seal bonding structure for use between composite graphite reinforced epoxy plates, particularly in an aircraft.

Because composite joints formed between the epoxy plates, forming the wings or fuselage, or fuel tanks integral therewith, are bolted or riveted in addition to being sealed, a reduced demand can be placed on the sealing adhesive with respect to margins of safety. The bolting pattern is designed so that the individual joints will carry the limit or the ultimate load even if the adhesive failed.

According to the invention, it has been determined that the adhesive bondlines can be altered intentionally by a filler or an interlayer of materials that will permit the easy formation of a crack in the bondline. It was surprisingly found that a conventional resin filled with carbon microspheres provided a bonding seal between graphite reinforced epoxy plates, adapted to be used in composite aircraft structure, including the fuel tanks, and permitted easy splitting of the seal between the plates without damage to the plates. That is, for repair purposes when the fasteners were removed, the plates were split with a wedge and the damage was confined to the bondline within the seal as desired.

In addition, the conductive carbon filler served to bleed off the static electrical charges that developed in the plate structure forming the aircraft and/or fuel tanks. That is, the conductive filler equalizes the static charges so as to eliminate potential differences in the structure.

The carbon spheres are hollow and have a diameter in the range of from 5 to 150 microns. The carbon is substantially lighter in weight than the resin and thus serves as a weight reducer in an aircraft in direct proportion to the extent that the seal is used. The weight percent of the carbon filler with respect to the weight of the resin is between 20 to 35%, and typically may be about 25%. In applying the seal, the resin and carbon filler are mixed and then used to impregnate a porous glass cloth or a layer of spaced fibers, inserted between faying surfaces of overlapping plates which are adapted to be secured together by bolt or rivet fasteners, coated with a dielectric. Use of the dielectric coating would typically prevent the metal fasteners from bleeding off static charges; hence, the need for another means such as the conductive carbon filler.

The secured plates are inserted into an oven where the resin is cured and the seal is formed.

As the prior art discussed above has indicated, carbon has been used as a means for bleeding off static and other charges to in effect ground the charges. However, the prior art does not suggest the present inventive structure and method. For example, the Netherlands publication teaches the use of foreign particles in a thermoplastic layer so as to increase the peel strength of the plastic and cause it to separate along the line where the embedded particles lie when the plastic is pulled in tension at right angles to the metal surface. In contrast, the present invention is designed to reduce the joint strength of a fuel tank seal adhesive, for example, in a composite airplane so that it will shear along the path of the carbon microspheres and not damage the adjacent plate structure. Because the plates are made of laminations they would be subject to delamination if the filler increased the peel strength of the plastic seal.

Futher advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings which are for illustrative purposes:

FIG. 3 is a pictorial exploded view, illustrating a seal according to the invention, and joints to be sealed thereby;

FIG. 4 is a plan view of the filler carbon microspheres, magnified about 50 times; and FIG. 5 is a view of the hollow carbon microspheres in a resin, magnified about 800 times.

BEST MODE FOR CARRYING OUT THE INVENTION

Figure 1:
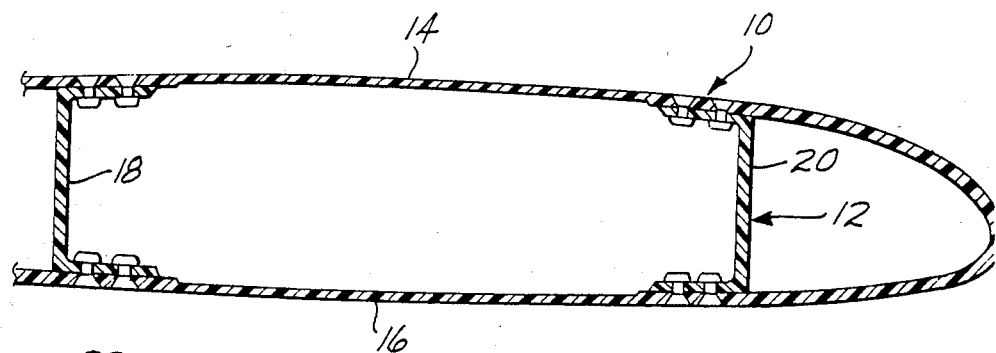
FIG. 1 is a fragmentary cross sectional view of an airplane wing, illustrating a fuel tank integral with the wing.

Referring again to the drawings, there is shown in FIG. 1 a fragmentary portion of a wing 10 of a composite aircraft. Composite aircraft may, for example, be formed of graphite reinforced epoxy plates. The plates, for the most part, are secured together at overlapping surfaces by dielectric coated metal fasteners in the form of bolts or rivets. Between the overlapping surfaces there are resin seals, particularly where the plates form fuel tanks.

Each plate is made from a multiple of laminations, each lamination being comprised of reinforcing graphite in the form of woven fibers or elongated spaced fibers. In both situations the graphite fibers are impregnated with an epoxy resin and the individual layers are positioned together and cured in an oven at about 300 degrees F. to form the solid laminated plate. The graphites used may be such as those described commercially as Hercules AS, Celion 3000, or Union Carbide T 300 and the resins may be such as Shell Epon 828, Narmco 5208, Hercules 3501, or Fiberite 934. The combination of resins and fibers used are Narmco 5208/T300, Hercules 3501/AS, and Fiberite 934/T300. The advantages of such materials in aircraft are that they are lightweight and stiff, compared to aluminum, for example. They also require no prestressing around fastener holes and do not suffer from fatigue in the sense that metal does.

The tested individual plate laminations had thicknesses of between 0.005 and 0.015 inches. Composite plates are as thich as 0.5 inch. When another resin is bonded on a plate, such as in the form of a seal, there is a problem in separating the two resins when repairs must be made to a fuel tank, for example. The problem is that the seal would tend to delaminate the plate when it is being removed therefrom for opening the tank. Seals, according to the invention, are made from the same type of resins mentioned above or from other conventional thermosetting resins.

Figure 2:
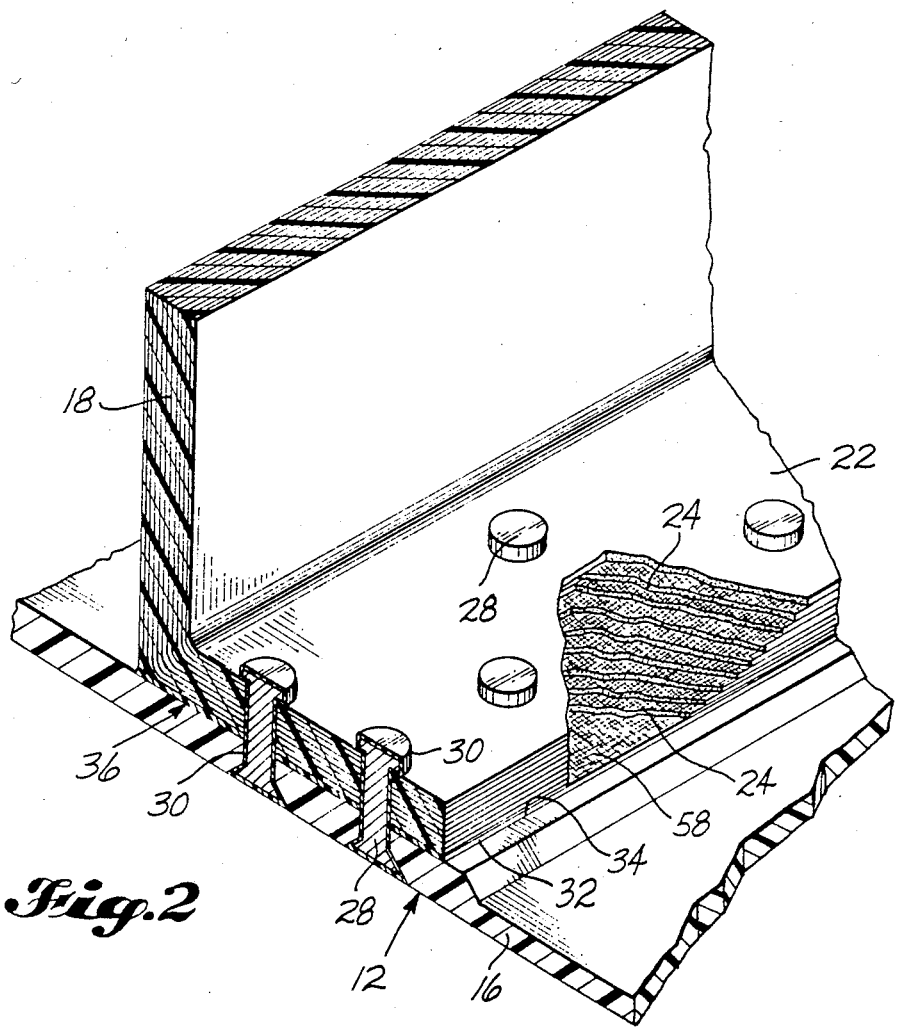
FIG. 2 is an enlarged end view of a corner of the wing tank in FIG. 1, illustrating the wing tank seal and the dielectric coated fasteners securing the sealed plates together.

In FIGS. 1 and 2, there is shown in end view a fuel tank 12 integral within the wing 10. Upper and lower walls 14 and 16 are walls both of the wing and the tank 12. Sidewalls 18 and 20 close the tank laterally between the two outer wing walls.

The walls 14, 16, 18 and 20 are formed of graphite reinforced epoxy plates as described above. The walls 18 and 20 are channel-shaped and as shown in FIG. 2, the lower end of the wall 18 has a short channel leg 22. The walls are also in "I" beam form.

The laminations usually cannot be seen in a finished end of a wall surface as provided by the plate 18 and its leg 22, but the series of laminations 24 are indicated in a broken away area in the leg 22.

Generally throughout a composite aircraft, plate members such as 22 and 16 are secured together by rivets or bolts 28 which may be tightened in a conventional way from the exterior or lower end of the tank 12, for example. Each of the bolts 28 are coated with a dielectric 30. The dielectric can be a sealant coating, an "O"-ring seal under the head, a washer with an embedded seal under a nut, a corrosion inhibiting coating on the fastener or a combination of the foregoing.

Extending between the plate parts 22 and 16, along their overlapping surfaces 32 and 34, is a resin seal, according to the invention, generally designated as 36.

A seal 36 is shown in FIG. 3 where it is adapted to be adhesively bonded to faying surfaces of graphite epoxy plates 40, 42 and 44. The plates are secured together by a multiple of dielectric coated, flat-headed fasteners 46.

The seal is made from an uncured resin in liquid form, as described above, by being mixed with hollow carbon microspheres, shown as 50 in FIG. 4, magnified about 50 times and as shown as cut spheres 52 and 54 in FIG. 5. The spheres 52 and 54 are magnified about 800 times and to the naked eye appear to be carbon dust. A continuous conductive contact extends along the carbon, the carbon spheres substantially forming a thin discontinuous, approximate layer, FIG. 4. However, the carbon is partially discontinuous with epoxy therebetween, FIGS. 4 and 5; that is, there is not a solid layer of spheres. The actual size of the spheres vary in the range of 5 to 150 microns.

The mixed liquid resin and carbon are applied to thin glass cloth thin glass fibers so that the cloth or fibers are fully impregnated with the mixture. The cloth 58, as shown in FIGS. 2 and 4, has a rectangular mesh of about 1/32 of an inch to a side. The uncured seal 36, as shown in FIG. 3, is applied to the surfaces of the plates as shown in FIG. 2 and then the fasteners 28 are inserted to secure the plates together.

Individual parts throughout the aircraft are secured together as shown in FIGS. 2 and 3, and are then placed in an oven in a temperature between 250 and 350 degrees F. to cure the resin and adhesively bond the plates and seal together, forming the seal between the plates.

The weight percent of the carbon with respect to the resin in the seal is in the range of between 20 and 35 and typically is about 25 weight percent. The thickness of the cured seal is about 0.013 inches.

Fuel tanks, as 12, eventually develop leaks and repairs must be made. Similarly, other repairs must be made to parts of the aircraft, avoiding damage to the plates which must be separated. For example, if the tank 12 had a leak along the seal 36 between the plate 22 and the plate 16, the plates would have to be separated in order to put in a new seal. In such a situation, the bolts 28 would be drilled out. Because the adhesive bondline has been weakened by the carbon filler, a wedge can be applied between the plates along the seal to cause the plates to be separated without damage thereto. After the repairs have been completed, a new seal can be installed and new bolts are inserted and the resin is again cured as necessary.

As stated, the carbon filler, which weakens the adhesive bond so that the plates can be easily separated, also equalizes static charges to eliminate differences in potential, that is, in effect, grounds the charges by bleeding off static electricity. Further, the carbon filler is considerably lighter weight than the resin, and thus, has a lightening effect throughout the aircraft. It is considered that the carbon filler is sufficiently conductive to solve any arcing problem that might occur in a joint caused by lightning.

The bonding seals, according to the invention, are believed to have the reliability equivalent to the "Scotchweld Process" in aluminum aircraft.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific form shown or uses mentioned except as defined in the accompanying claims.

What is claimed is:

1. For use in an aircraft having composite reinforced epoxy plates forming aircraft walls, each plate having layers of reinforcing fibers impregnated with epoxy to form a series of laminations, one lamination being along each layer, an adhesive seal for bonding and sealing overlapping faying surfaces of said plates to form joints between the plates, said seal comprising:

conductive material and a resin mixed with thin fibers, the resin in the mixture being cured between the overlaping surfaces to bond and seal them together;

the conductive material structurally weakening the cured seal so that plates sealed and bonded together by the seal can be forcibly separated at a joint without structurally changing the laminations of the plates, whereby seals can be replaced without damaging the plates.

2. The seal according to claim 1 in which:
the seal is a thin sealing bondline in a joint to permit the plates to be wedged apart at the bondline,
whereby damage from the wedging is limited to the bondline within the seal.

3. The seal according to claim 1 in which:
the conductive material is in the form of generally hollow carbon microspheres having diameters in the range of 5 to 150 microns.

4. The seal according to claim 3 in which:
the seal has a thickness of about 0.013".

5. The seal according to claim 3 in which:
the weight percent of the carbon with respect to the resin in the seal is in the range of between 20 to 35, and the density of the carbon microspheres is substantially less than that of the resin in the seal.

6. The seal according to claim 5 in which:
the carbon microspheres appear to be carbon dust to the naked eye, forming a continuous conductive contact path in the seal but being irregularly spaced by the seal resin so as not to form a continuous solid layer.

7. The seal according to claim 1 in which:
said conductive material is adapted to equalize negative and positive static charges in and around the plates to eliminate potential differences in the aircraft.

8. For use in an aircraft having graphite reinforced epoxy composite plates forming aircraft walls, each plate having layers of graphite reinforcing fibers impregnated with epoxy to form a series of laminations, one lamination being along each layer, an adhesive seal for bonding and sealing overlapping faying surfaces of said plates to form joints between the plates, said seal comprising:

conductive material and resin mixed with thin fibers, the resin in the mixture being cured between the overlapping surfaces to bond and seal them together;

said conductive material forming a continuous conductive path within the seal and being substantially in the form of a thin discontinuous, approximate layer; the material being irregularly spaced by resin adjacent the continuous conductive contact path;

a sufficient amount of conductive material being present in the cured seal to weaken the seal so that plates sealed and bonded together by the seal can be forcibly separated at the joint without structurally changing the laminations of the plates.

9. The seal according to claim 8 in which:
the seal provides means for forming a thin sealing bondline in a joint to permit the plates to be wedged apart at the bondline,
whereby damage from the wedging is limited to the bondline within the seal.

10. The seal according to claim 8 in which:
the conductive material is in the form of generally hollow carbon microspheres having diameters in the range of 5 to 150 microns.

11. The seal according to claim 10 in which:
the seal has a thickness of about 0.013".

12. The seal according to claim 10 in which:
the weight percent of the carbon with respect to the resin in the seal is in the range of between 20 to 35, and the density of the carbon microspheres is substantially less than that of the resin in the seal.

13. The seal according to claim 12 in which:
the carbon microspheres appear to be carbon dust to the naked eye, forming a continuous conductive contact path in the seal but being irregularly spaced by the seal resin so as not to form a continuous solid layer.

14. The seal according to claim 8 in which:
the approximate layer of conductive material forms apart of a bondline within a seal forming joint to permit the plates to be wedged apart at the bondline,
whereby damage from the wedging is limited to the bondline within the seal.

15. The seal according to claim 8 in which:
said conductive material is adapted to equalize negative and positive static charges in and around the plates to eliminate potential differences in the aircraft.

* * * * *